US006681109B1

(12) United States Patent
Leifer

(10) Patent No.: US 6,681,109 B1
(45) Date of Patent: Jan. 20, 2004

(54) SERVER CALL SYSTEM

(76) Inventor: Richard Leifer, 11 Beaumont Dr., Melville, NY (US) 11747

( * ) Notice: Subject to any disclaimer, the term of this patent is extended or adjusted under 35 U.S.C. 154(b) by 0 days.

(21) Appl. No.: 09/567,454

(22) Filed: May 8, 2000

(51) Int. Cl.[7] .................................................. H04M 3/42
(52) U.S. Cl. ...................................... 455/414.1; 705/15
(58) Field of Search .......................... 455/414, 66, 456, 455/456.1, 456.6, 456.5, 457; 379/88.11, 88.12; 705/15

(56) References Cited

U.S. PATENT DOCUMENTS

| 4,250,491 | A |   | 2/1981  | Dotson          |       |
|-----------|---|---|---------|-----------------|-------|
| 4,511,161 | A |   | 4/1985  | Gruner          |       |
| 4,935,720 | A |   | 6/1990  | Kalfoun         |       |
| 5,455,851 | A |   | 10/1995 | Chaco et al.    |       |
| 5,515,426 | A |   | 5/1996  | Yacenda et al.  |       |
| 5,699,039 | A |   | 12/1997 | Korzen          |       |
| 5,822,418 | A |   | 10/1998 | Yacenda et al.  |       |
| 5,845,263 | A | * | 12/1998 | Camaisa et al.  | 707/1 |
| 6,009,333 | A |   | 12/1999 | Chaco           |       |
| 6,201,957 | B1| * | 3/2001  | Son et al.      | 455/406 |
| 6,208,976 | B1| * | 3/2001  | Kinebuchi et al.| 705/15 |
| 6,313,737 | B1| * | 11/2001 | Freeze et al.   | 340/10.1 |
| 6,463,131 | B1| * | 10/2002 | French-St. Georege et al. | 379/88.23 |

* cited by examiner

Primary Examiner—Nay Maung
Assistant Examiner—Tu Nguyen
(74) Attorney, Agent, or Firm—Keusey, Tutunjian & Bitetto, P.C.

(57) ABSTRACT

A server call system that enables the customer to be in direct contact with the server at all times. A keypad is disposed at customer locations and adapted to receive item requests from the customer. The keypad is in wireless communication with a server pager carried by a designated server. The customer inputs an item request into the keypad and it is sent to a predetermined or dynamically determined server pager for fulfillment. In this manner, not only is the efficiency of the establishment increased by eliminating wait time by customers for submitting a request to their server, but the server can effectively serve more areas with less direct customer contact.

6 Claims, 3 Drawing Sheets

ITEM REQUEST CODES

| 001 | WATER | 100 | LUNCH SPECIAL |
|---|---|---|---|
| 002 | BREAD | 101 | DINNER SPECIAL |
| 003 | DRINKS | 102 | MENU ITEMS |
| 004 | COFFEE | ⋮ | ⋮ |
| ⋮ | ESPRESSO | ⋮ | ⋮ |
| ⋮ | CAPPUCINO | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

SERVER CALL SYSTEM

BACKGROUND OF THE INVENTION

1. Field of the Invention

The present invention relates to restaurant services, and more particularly, to a server call system employing wireless communication protocol in a novel manner.

2. Description of the Related Art

One of the primary goals of a restaurant business is to provide prompt, efficient and courteous service to their customers while maintaining food quality. In furtherance of these goals, restaurants often implement electronic systems to help maintain communications between the customer, waiter/server and kitchen.

An example of such system is described in U.S. Pat. No. 4,935,720 which discloses an apparatus for the transmission of information in a restaurant. The apparatus discloses a waiter-restaurant information transfer system in which a principal treatment unit is disposed in the kitchen area. The principal unit includes a set of buttons associated with respective tables or a keyboard that can be operated by food service personnel to provide a display, at a board in the dining room and at a region at which the waiter can pick up prepared food service items. When the waiter responds to the signal at the pickup region, and upon pick up of the food service item, they press a push button or operate a keyboard to cancel the previous display.

U.S. Pat. No. 4,511,161 discloses an identification and control apparatus for service personnel for a restaurant. The disclosed method and apparatus divides the working space of the restaurant into selected stations and for assigning service personnel to these stations. Identification elements are associated with a respective subject layout which comprises a transparent plastic sheet on which are drawn divisions of the restaurant into separate sections and an underlying floor plan showing, on a reduced scale, the physical area of the restaurant. A correlation sheet is secured in proximity to the layout to indicate the particular subject associated with its respective identification element and its station in accordance with the number of stations the restaurant is to be divided at any given time of the day. A plurality of transparent sheets are furnished corresponding to the maximum number of divisions of the restaurant into separate sections.

Both the '720 and '161 patents are directed at organizing restaurant personnel in an effort to maintain an efficient and functional working environment. However, neither the '720 nor '161 patents consider the customer as a factor when implementing an efficient operation scheme. However, one of the most important considerations in a restaurant is their customer service. As such, the customer and the restaurant personnel's service of the customer in an efficient manner is an integral part of successful operation of a restaurant. The most common complaint among restaurant goers is the inability to get the waiter's attention when they would like to order something or request something from their waiter.

U.S. Pat. Nos. 4,250,491 and 5,699,039 disclose various devices for obtaining the waiter/server's attention when the customer requires the same. The '491 patent shows a table signal device that is situated at the customer table and is physically lifted by the customer to signal their need for the waiter/server's attention. A light on the top of the device is illuminated when the customer raises the sign to make it highly visible. The '039 patent discloses a menu stand or similar device that includes a "call waiter" button at its base. When the customer presses the "call waiter" button a thin electroluminescent (EL) surface element mounted on the menu holder that enables the menu holder to be illuminated in order to summon the waiter/server.

The devices disclosed in the '491 and '039 patents require the customer to summon the waiter/server, wait for them to arrive, request the item or items desired and then wait for the waiter to retrieve the requested item(s). This series of events, although common, do not promote, and in fact hinder the efficient operation of a restaurant establishment. Thus, it would be desirable to provide a system that can eliminate this series of inefficient steps and enable the customer to be in direct communication with the waiter during their stay at the restaurant.

SUMMARY OF THE INVENTION

It is therefore an object of the invention to provide a server call system that increases service efficiency in a restaurant establishment.

This and other objects are achieved in accordance with an embodiment of the present invention in which a server call system comprises a customer transmitter disposed at each customer location within a restaurant and a server receiver in wireless communication with said transmitter and being carried by service personnel with the restaurant. The customer transmitter includes an input keypad adapted to receive customer item requests and a display for displaying a plurality of information to the customer. The server receiver includes a display screen for displaying received item requests from said transmitter and at least one of an audible, visual and tactile indicator for indicating when a customer item request has been received from a customer transmitter.

In another embodiment, a central processing station is provided within the restaurant establishment to administrate communication between all customer location transmitters and server receivers. The central processing station includes all processing, memory and wireless communication protocol to administrate the system. The customer transmitters and server receivers can include transponders so as to enable the central station to identify the location of each transmitter and receiver. In this manner, the central station can administrate communication between the customer location transmitters and server receivers by routing customer item requests to the server receiver of the service personnel most closely located to a service area that is to be used to fulfill the customer item request.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the views.

DETAILED DESCRIPTION OF THE PRESENTLY PREFERRED EMBODIMENTS

Figure 1:
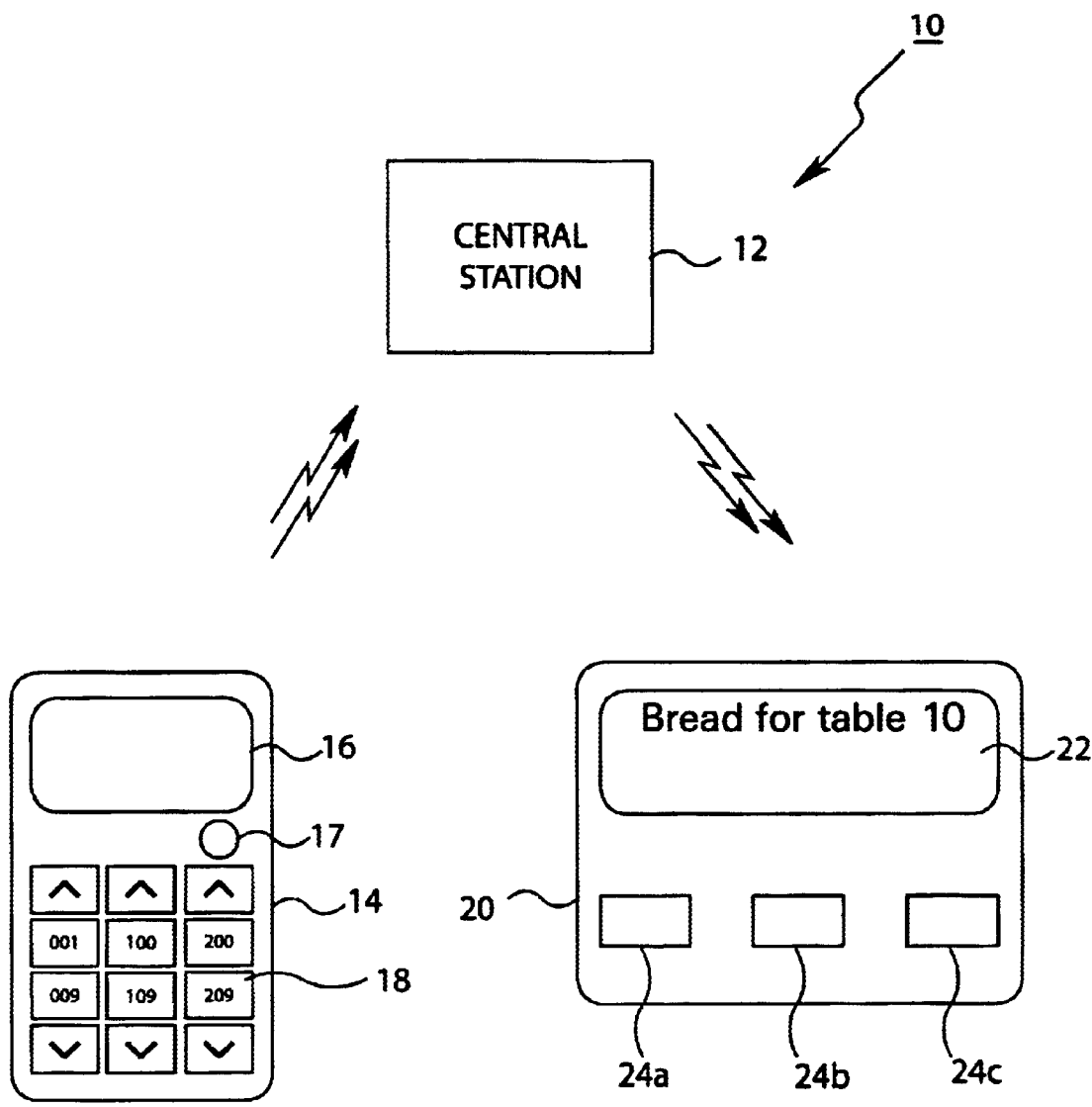
FIG. 1 is a block diagram of the server call system according to a first embodiment of the invention.

Referring to FIG. 1, there is shown the server call system 10 according to an embodiment of the present invention. The server call system 10 includes a plurality of customer keypad devices 14, a central station 12 in wireless communication with keypad devices 14 and a server paging device 20 also in wireless communication with the central station 12. The Wireless Application Protocol (WAP) implemented by central station 12, keypads 14 and paging devices 20 can be any suitable wireless communication protocol. Those of ordinary skill in the art will recognize that WAP is a secure specification that allows user to access information via handheld wireless devices. WAP supports most wireless networks including, for example, CDPD, CDMA, GSM, PDC, UMTS, etc. It is understood that radio frequency (RF) techniques including, but not limited to Bluetooth and cellular frequency ranges can also be utilized efficiently in the application contemplated herein.

Central station 12 includes all processing, transmitting, receiving and memory systems necessary to maintain and control the wireless network implemented in the server call system of the present invention. Central station can be implemented, by way of example, using a general purpose computer having radio transmission peripheral devices for transmitting and receiving wireless signals to and from the keypads 14 and server pagers 20. Central station 12 can also be a dedicated processing device designed to include all circuitry, processing and memory required for the present application.

Keypad 14 includes a plurality of keys 18 and a display 16 for providing the user with a display of the user selected request and possibly a confirmation of sending and receipt of the user request by the central station 12. The confirmation of the sending of an item request may also be provided by a separate visual indicator 17, such as a light or LED. This confirmation indicator 17 may also serve as an indicator for the restaurant that this customer has input a request and is awaiting its fulfillment. For example, indicator 17 may go on solid after a request has been made, and stay on until the request is fulfilled. In this manner the indicator 17 serves a dual function of confirming the sending of a request, and notifying the surrounding area that such request has been made. The plurality of keys 18 can be numeric, alphanumeric of any suitable combination thereof. The number of keys 18 may be increased or decreased depending on specific applications without departing from the spirit of the present invention. By way of example, keys 18 are shown having numeric ranges and up and down arrows for enabling the user to scroll through items while viewing the same on display 16. Keypad may also include an internal memory (e.g., random access memory—RAM) for storing customer item request codes, which are described hereinbelow with reference to FIG. 3.

The paging device 20 includes a display 22 which provides the server the customer request and their respective location within the restaurant. By way of example, display 22 is shown displaying a message "Bread for table 10" which instructs the server to bring bread to table 10. Display 22 may be any suitable type of display including, for example, liquid crystal displays (LCD). The display 22 can also include illumination means or a backlight for easy viewing in dimly lit surroundings. Paging device 20 may include buttons 24a and 24b for reviewing, deleting, storing or otherwise manipulating data received by paging device 20. In addition, a light 24c may be provided which may blink or otherwise provide an additional visual signal to the server that a customer request has been received. Paging device 20 may also include a vibration mode (tactile indicator) that is activated/deactivated by one of the buttons 24a or 24b or a combination of both.

In operation, the keypad devices 14 are located at each table or other customer locations where customers are expected to sit or wait for service. The seats at a bar could also be examples of such locations. The central station 12 is preferably programmed with the geographic position (i.e. customer location) of each keypad device 14. This geographic position layout is typically the table/seating layout for the respective establishment.

Each server/waiter or other service personnel within the restaurant has their own paging device 20 which is a uniquely addressable device, similar to telephone paging devices, so that it is directly addressable by the central station 12. In this manner, the central station 12 can selectively send signals to one or more of the paging devices in response to received service request criteria from the customer keypads. Central station 12 is programmed to receive the keypad transmitted signals, identify their origin (i.e., the customer location from which the keypad 14 has been actuated), and transmit the customer request to the server pager 20 of the server assigned to that customer location. Accordingly, each customer keypad 14 and signals received therefrom by the central station 12 are identifiable as originating from the table or specific customer location of the keypad 14 within the establishment.

The server carrying paging device 20 is trained to respond to the customer request received via pager 20, thus eliminating the need for customer to obtain the server's attention and subsequently instruct them to retrieve a desired item. In an additional embodiment, a remotely located display connected to the server pager 20 is provided. For example, a remotely located display may be positioned on the server's tray or other convenient location to eliminate the need for the server to go looking at their server pager every time a new customer item request is received. The remotely located display 26 (FIG. 2) is in communication with server pager 20 and as such, can provide a redundant display as that shown on display 22. The disposition of the remotely located display is a matter of design choice, provided it is visually observable by the server, even when their hands are full. This significantly increases the server's ability to efficiently serve the customer and potentially increase the number of customer locations any one server can manage.

Figures 2, 3:
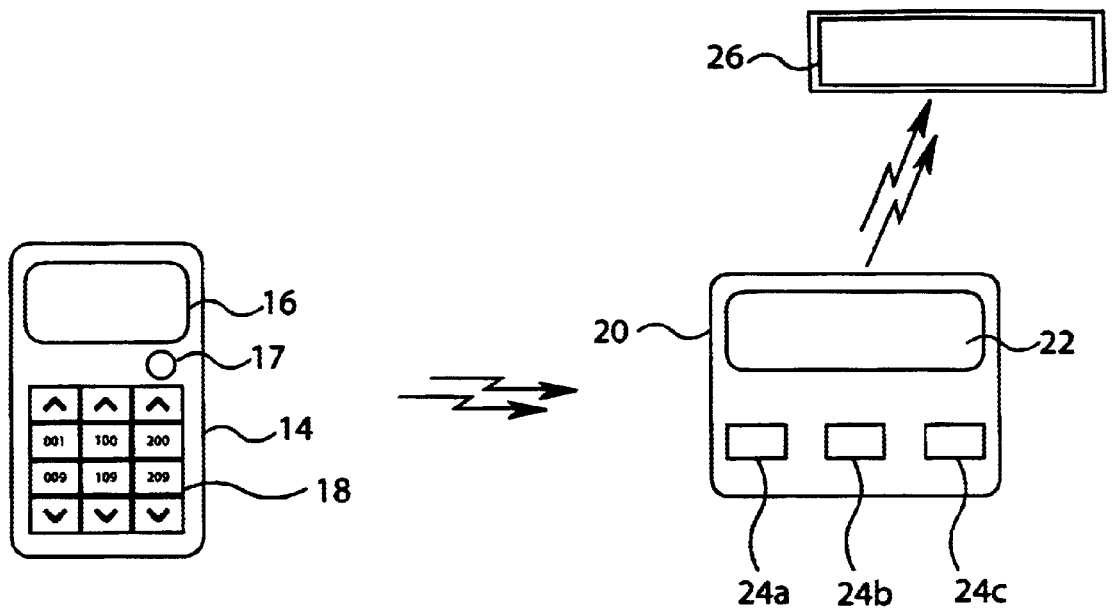
FIG. 2 is a block diagram of the server call system according to a second embodiment of the invention.
FIG. 3 is an diagrammatic representation of a list of request codes implemented according to an exemplary embodiment of the present invention.

FIG. 3 shows an example of a request code listing that may be a printed sheet located at the respected customer location or may be programmed into the internal memory of keypad 14 and accessible through any suitable operating system, such as, for example, Windows CE®, PalmOS®, EPOC, FLEXOS® and OS/9. One of ordinary skill will recognize that various different operating systems may be used without departing from the spirit of the present invention. In accordance with a first embodiment of the invention, when a customer inputs a request code into their designated keypad 14, the code will be transmitted to central station which will send the particular request to the server pager 20 to instruct them to fulfill the request by bringing a particular item or service requested to the customer location from which the request originated. The requests can be, for example, ordering menu items or beverages, requesting condiments, requesting the server's attention and requesting the check when appropriate.

FIG. 2 shows a second embodiment of the invention where the central station is eliminated and keypad 14 transmits the customer item requests directly to a server pager 20. In this embodiment, the keypads 14 are programmed to transmit the customer requests to a specific server pager 20 of the server handling the pre-designated customer locations. For example, the WAP can be configured such that a select predetermined number of keypads 14 from predetermined customer locations transmit their customer requests directly to a single predetermined server pager 20. In this arrangement, the restaurant or other establishment is divided into customer locations and service personnel is designated to handle groupings of those customer locations. In other words, each predetermined group of customer locations would have keypads 14 that are configured to transmit to one server pager 20 so as to directly address the server personnel handling that group of customer locations. In addition to the customer requests, keypads 14 may also transmit identification information such as, for example "message received from table 2" to the pager 20 so that the server knows the exact origin of the request in case the server has a question for the customer relating to their request.

In another contemplated embodiment, central station 12 can include a people finding feature, or more particularly a service personnel locating system that enables the central station 12 to route an incoming item request from keypad 14 to the pager 20 of the nearest service personnel available to fulfill such request. Examples of people or object locating systems can be found in U.S. Pat. No. 5,455,851, the entire contents of which are incorporated herein by reference. Other personnel locating system that are used in conjunction with telephone systems are disclosed in U.S. Pat. Nos. 5,515,426, 5,822,418 and 6,009,333, each of which are incorporated herein by reference. The PBX as disclosed in these patents may be substituted with the central station of the present invention.

Figure 4:
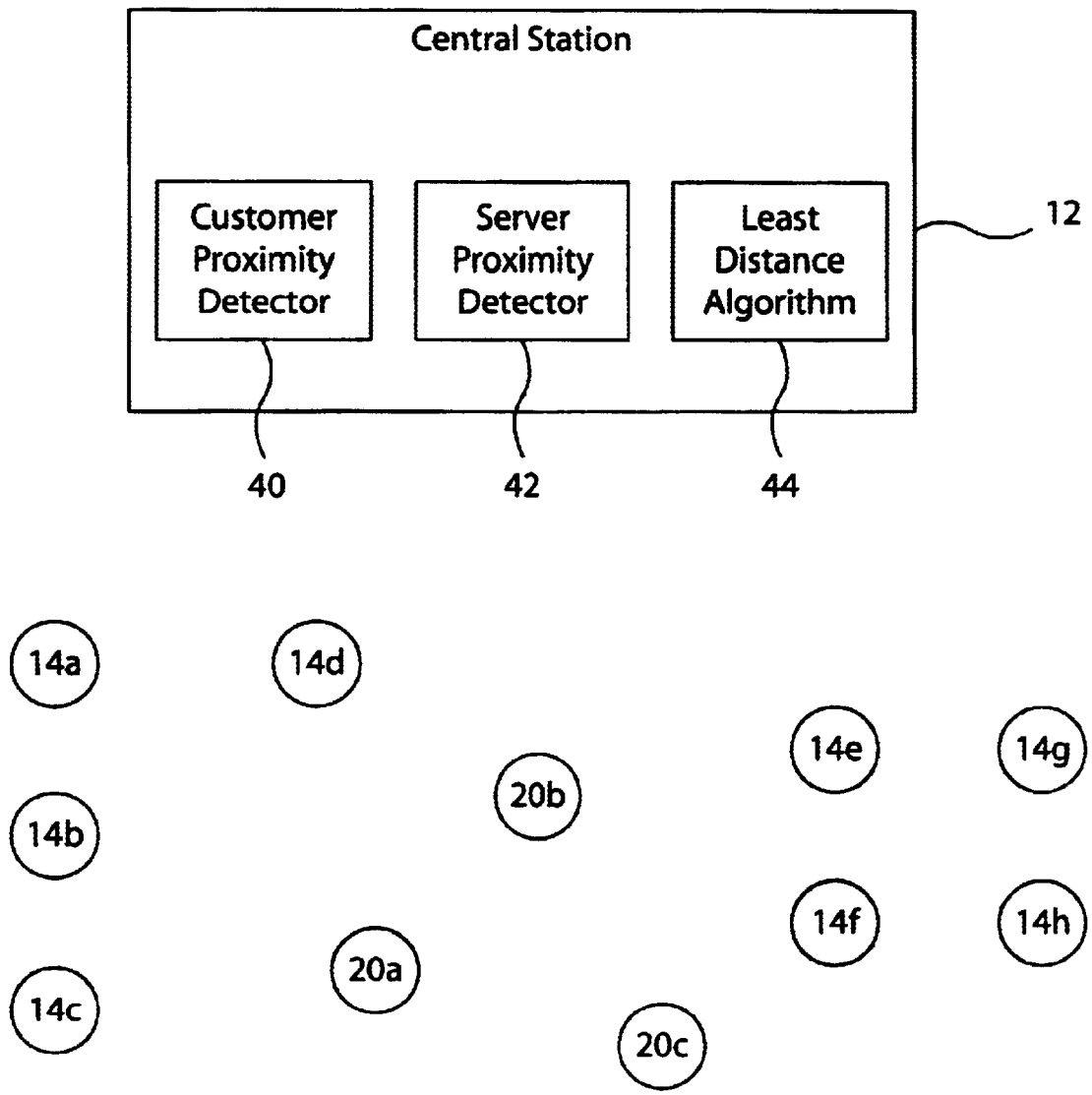
FIG. 4 is a further block diagram of the server call system according to the second embodiment of the invention.

In this alternative embodiment, each server pager 20 and customer keypad 14 includes a transponder that enables the central station 12 to identify and monitor the location of each server within the establishment and their proximity to the customer locations and the food service locations (e.g., kitchen or other server stations). FIG. 4 shows a block diagram representation of a plurality of customer locations 14a–14h and a some server pagers 20a–20c scattered within the restaurant establishment. Thus, for example, when a customer inputs a request into their keypad 14a, central station 12 identifies the request and its origin using a customer proximity detector 40 or other processing means, identifies the server pager 20b most closely located to the service station from which the server would retrieve a requested item or fulfill the request, and directs the request to the identified server's pager 20b. In this example, although server pager 20a is physically closer to customer location 14a, central station routes the customer request to server pager 20b because it has been determined by central station 12 that the server carrying pager 20b is closer to the service area for fulfilling the customer 14a request.

Central station 12 includes a server proximity detector or other similar processing means to dynamically determine the location of each server pager 20 within the establishment, and a least distance algorithm or processor 44 for determining the respective distances between the server pagers and predetermined service areas within the restaurant.

Central station 12 can also be configured to send specific item requests such as food and beverage requests directly to the kitchen and bar, respectively, with subsequent notification to a selected server upon expiration of a predetermined time or receipt by the central station of a completion notice sent from the kitchen or bar when the request has been fulfilled.

In this embodiment, the customer locations need not be grouped or otherwise identified within central station prior to operation of the system. Through the use of transponders, central station 12 will identify the geographic origin of the customer's item request and use that information to route the request to the closest service personnel.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A server call system comprising:

a central station disposed in a restaurant and having processing means, memory means and communication means;

a customer transmitter disposed at customer locations within the restaurant and being in communication with said central station, said transmitter having an input device for receiving customer item requests and means for displaying a plurality of information to the customer; and a server receiver in communication with said central station and being carried by service personnel serving customer locations within the restaurant, said server receiver having a display for communicating received item requests from said transmitter and at least one of an audible, visual and tactile indicator for indicating when a customer item request has been received from said central station, wherein said central station transmits received customer requests to the server receiver being carried by the service personnel corresponding to the customer location from which the customer request originated, and wherein said customer transmitters and said server receivers further comprise transponders and said central station further comprises an identification system for identifying the location of each customer transmitter and server receiver, wherein said central station routes received customer item requests to the server receiver of the service personnel identified to be closest in proximity to a service area from which the customer item request may be fulfilled.

wherein customer location information corresponding to the restaurant and server receiver information corresponding to the customer locations is stored in said memory means of said central station.

2. The server call system in accordance with claims 1, further comprising:

wireless communication means for wirelessly communicating information between said central station, said customer transmitter and said server receiver; and a wireless application protocol for managing said wireless communication means and establishing said wireless communication between said central station, said customer transmitter and said server receiver.

3. The server call system in accordance with claim 1, further comprising a visual indicator on said customer transmitter for confirming the sending of an item request to said server receiver.

4. The server call system in accordance with claim 1, wherein said server receiver further comprises a remotely located display for further communicating received customer item requests.

5. The server call system in accordance with claim 1, wherein said tactile indicator comprises a vibration device within said server receiver.

6. The server call system in accordance with claim 1, wherein said visual indicator comprises a light on the server receiver.

* * * * *